April 26, 1927.　　J. P. CROWLEY　　1,626,395
DRAWING SHEET GLASS
Filed July 14, 1922　　2 Sheets-Sheet 1

INVENTOR
Joseph P. Crowley
BY C. A. Rowley
ATTORNEY

April 26, 1927.

J. P. CROWLEY 1,626,395

DRAWING SHEET GLASS

Filed July 14, 1922

INVENTOR
Joseph P. Crowley
BY C.A. Rowley
ATTORNEY

Patented Apr. 26, 1927.

1,626,395

UNITED STATES PATENT OFFICE.

JOSEPH P. CROWLEY, OF TOLEDO, OHIO, ASSIGNOR TO THE LIBBEY-OWENS SHEET GLASS COMPANY, OF TOLEDO, OHIO, A CORPORATION OF OHIO.

DRAWING SHEET GLASS.

Application filed July 14, 1922. Serial No. 574,883.

This invention relates to the art of drawing sheet glass, and more particularly to a new and improved method and apparatus for producing a continuous sheet of glass by drawing the sheet from a mass of molten glass between two polished metal surfaces, both moving with the sheet at its source.

The ultimate object of the invention is to produce a continuous flat sheet of glass having smooth, even, surfaces, which will require little or no polishing to provide a transparent, plate-glass surface. In general, the improved system comprises flowing a continuous stream of liquid glass onto the upper polished horizontal surface of a continuously moving metal belt. The pool of glass thus deposited on the moving belt is drawn under a polished metal roller mounted above the belt and spaced therefrom a distance substantially the thickness of the sheet of glass to be produced. The sheet is drawn along, and carried upon the belt, for a short distance until it is substantially set in sheet form, after which it passes off into the leer.

Other objects and details of the invention will be better understood from the following detailed description of one form of apparatus adapted to carry out the principles of the invention.

Figure 1:
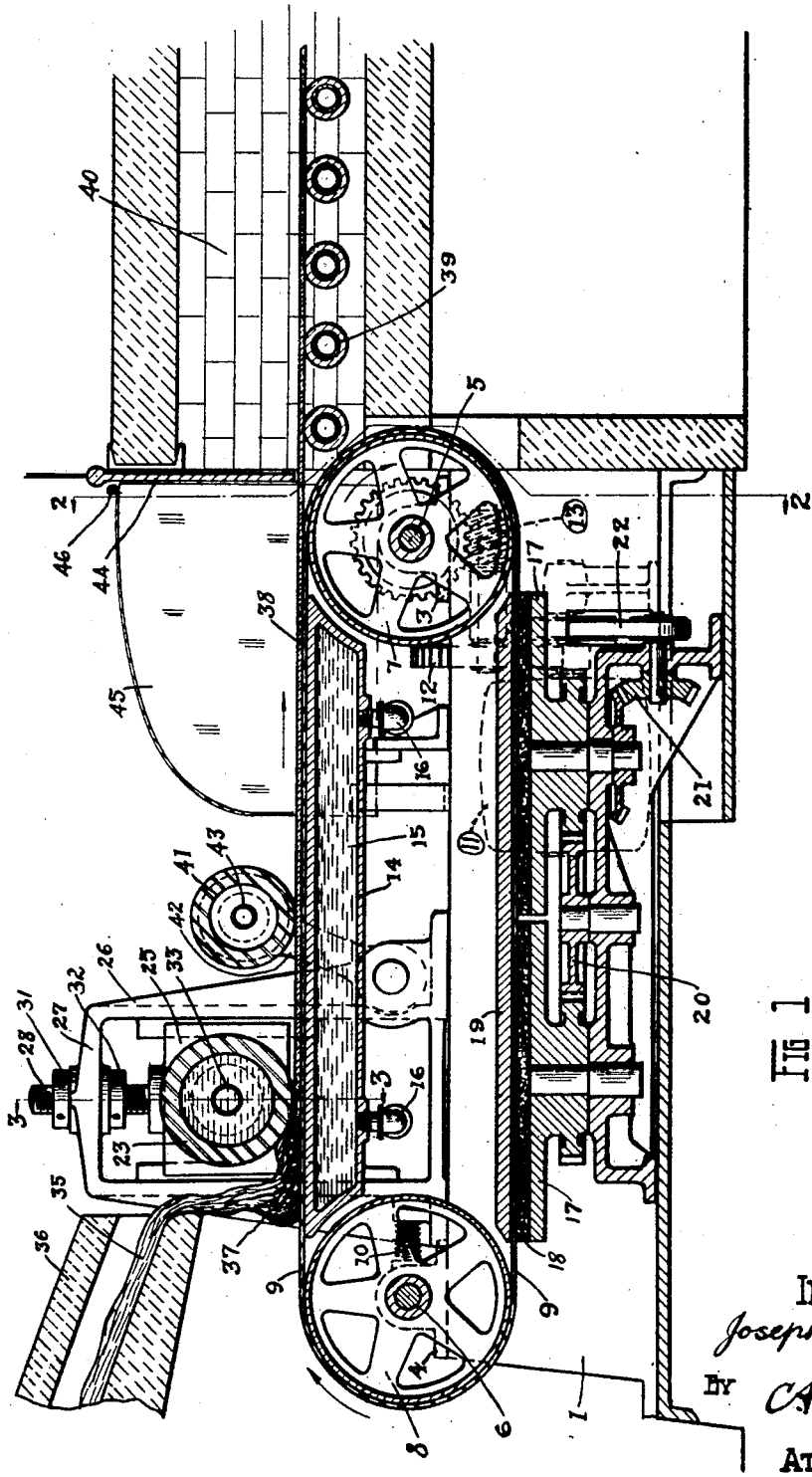
Fig. 1 is a central longitudinal vertical section through the apparatus, taken substantially on the line 1—1 of Fig. 2.
Figure 2:
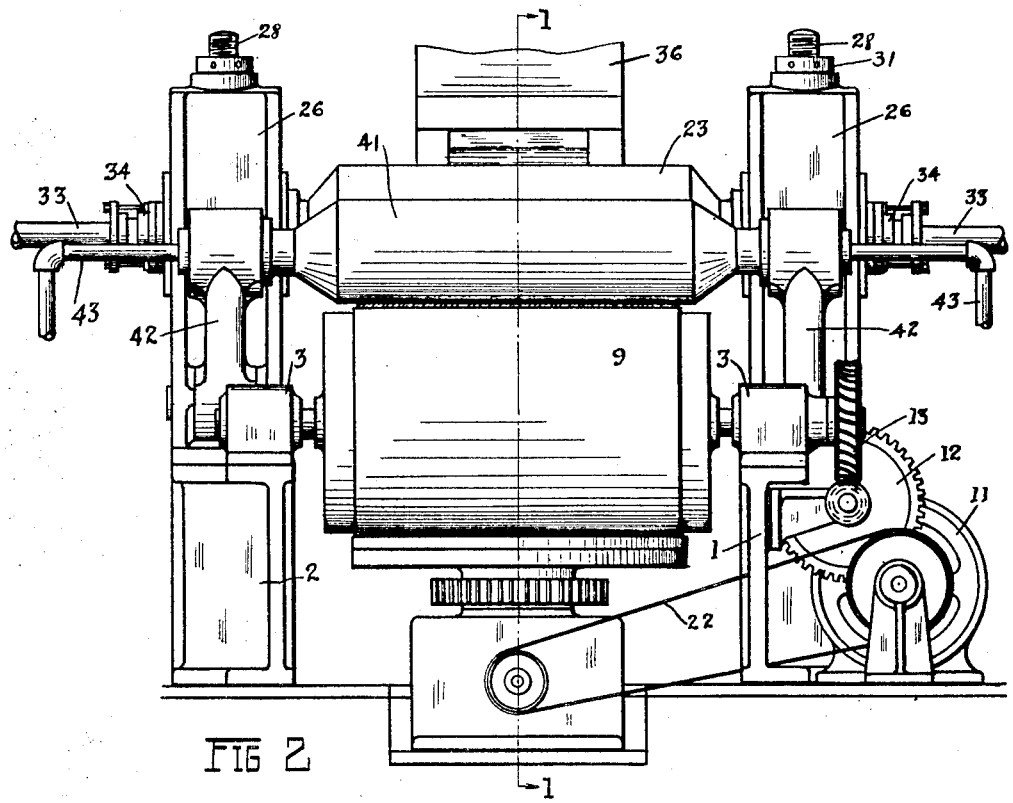
Fig. 2 is an end view of a portion of the apparatus, taken substantially on the line 2—2 of Fig. 1. In this view the hood shown in Fig. 1 has been omitted.
Figure 3:
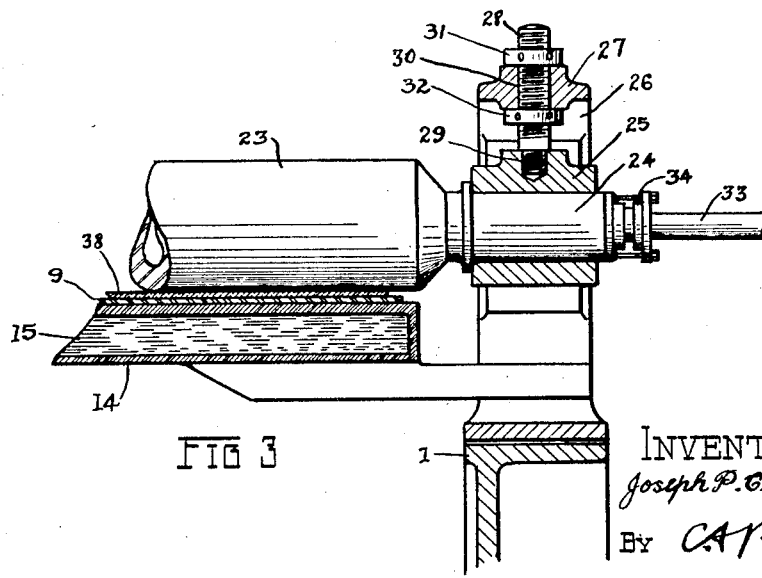
Fig. 3 is a partial vertical cross-section taken substantially on the line 3—3 of Fig. 1.

Suitable pedestals 1 and 2, support bearings 3 and 4 for the shafts 5 and 6 of a pair of cylindrical drums 7 and 8. Looped about the drums 7 and 8 is an endless metallic belt 9. This belt is preferably made of some heat-resisting alloy that will take and retain a high polish, such as Monel metal or nichrome-steel. The bearings 4 for the drum 8 are slidably mounted on the supporting pedestals, and compression springs 10 confined between these bearings and a stationary member, force the drum 8 away from the drum 7 within the belt loop. In this way the metal belt is always kept under tension, and expansion or stretch may be compensated for. Drum 7, and consequently the belt 9, are slowly driven in the direction of the arrows Fig. 1, from a motor 11 through a train of gearing 12, including the reducing worm-gearing 13.

The upper horizontal run of the belt 9 is slidingly supported upon the flat upper surface of a table 14, also mounted on the pedestals 1 and 2. This supporting table is hollow as at 15, and a circulation of cooling fluid, such as water, is constantly maintained therethrough, the pipe connections being indicated at 16.

Below the lower horizontal run of the belt are mounted a series of polishing members 17, to clean and polish the outer glass-contacting surface of the belt. Two polishers 17 are here shown but more might be used. These polishers comprise horizontally rotating discs having felt pads 18 in polishing contact with the surface of the belt. Rouge or other polishing material may be used on any of the polishers, although preferably the last polishing disc functions as a cleaner to remove all foreign material from the belt surface. Above the lower run of the belt, within the belt loop, is a stationary member 19, having a flat smooth lower surface, which serves as a backing for the belt while being acted upon by the polishers. The polishing discs are geared together, as at 20, and are preferably driven from the motor 11 through suitable gearing, such as the bevel gears 21 and belt gearing 22.

Mounted above the belt 9, near the start of its upper horizontal run as shown in Fig. 1, is a polished metal roller 23, preferably formed of the same alloy or one similar to the belt 9. The trunnion extensions 24 of this roller are journaled in bearings 25, vertically slidable in supporting yokes 26, mounted on the pedestals 1 and 2. The bearings 25 are hung from the crossbars 27 of the yokes 26, by means of screws 28, anchored in the bearing blocks as at 29, and passing up through holes 30 in the crossbars 27. Adjusting nuts 31 and 32 anchor the screws in place in the yokes. By adjusting the nuts 31 and 32, the amount of clearance between the lower surface of the roller 23 and the upper surface of belt 9 may be adjusted. It is this clearance that determines the thickness of the sheet of glass that is drawn.

Roller 23 is hollow and is cooled by flowing water therethrough. The pipe connections 33 for the circulating water, enter the trunnions 24 through stuffing-boxes 34.

A stream of molten glass 35 is allowed to flow down a trough or chute 36, from a tank-furnace or any other suitable source of molten glass, onto the moving belt 9. This molten glass forms a pool 37 on the upper surface of the belt, and as the belt is constantly moving toward roller 23, this pool is constantly being carried under the roller. As the molten glass is carried under the roller it is flattened out into the form of a sheet 38, which is carried on the flat upper surface of the belt to the end of the loop where it passes off onto the conveying rollers 39 in the leer 40.

In operation, sheet 38 is drawn along by friction on the belt 9 and the driven leer rollers 39, and the formed sheet acts continually as a bait to draw more of the molten glass from the pool 37 under the roller 23. The sheet is formed by a drawing action rather than a rolling one, as the roller 23 is not driven but turns freely in its bearings. The sheet is really formed by being drawn through the slot between the table and the roller. However, one side of the slot—the table—moves with the sheet, and the other side—the roller—is also free to move with the sheet at its source, so that there is little or no sliding friction on the sheet. Furthermore, since the sheet contacting surfaces of the belt and roller are both smooth, uninterrupted and highly polished, there is nothing to mar the surfaces of the sheet which will be formed with a smooth even surface requiring little or no polishing to provide a transparent plate-glass finish.

A second idler roller 41, journaled in links 42, pivoted to the yokes 26 or some adjacent stationary part, rolls freely on the sheet 38 a short distance in advance of the forming roller 23. The function of this second roller is to insure the sheet remaining flat on the table 9, and to overcome the tendency of the sheet to curl up or follow the curvature of the roller 23, as the sheet is formed. This second roller should also be cooled. This may be accomplished by blowing air or other fluid into the roller through pipes 43.

An adjustable gate 44 may be placed at the entrance to the leer to confine the heated air and gases. Also, a hood 45, which is shown as pivoted at 46 so that it may be swung up to give access to the sheet and other parts therebeneath, is placed over most of the sheet beyond the roller 41, to prevent chilling the sheet before it reaches the leer.

Claims:

1. An apparatus for producing sheet glass, comprising an endless metal belt, supporting means for the belt including a stationary water-cooled table within the belt loop having a flat horizontal upper surface supporting the upper run of the belt, polishing means acting on the outer surface of the belt during its lower run, a metallic water-cooled roller having a polished surface adjustably mounted above the upper run of the belt, means constantly feeding a stream of molten glass upon the upper polished surface of the belt, and means for driving the belt to draw the glass from the stream under the roller and carry it away in sheet form.

2. In an apparatus for producing sheet glass, an endless metal belt upon the upper horizontal run of which the sheet is formed and flattened, supporting means within the belt loop for the upper run of the belt, and a series of rotating polishing discs acting upon the lower return run of the belt.

3. In an apparatus for producing sheet glass, an endless metal belt upon the upper horizontal run of which the sheet is formed and flattened, supporting means within the belt loop for the upper run of the belt, a series of rotating polishing discs acting upon the lower return run of the belt, and a common driving means for the belt and polishing discs.

Signed at Toledo, in the county of Lucas, and State of Ohio, this 12th day of July, 1922.

JOSEPH P. CROWLEY.